Dec. 23, 1958 J. W. HAANSTRA ET AL 2,866,179
RECORD SELECTOR
Filed Dec. 23, 1955
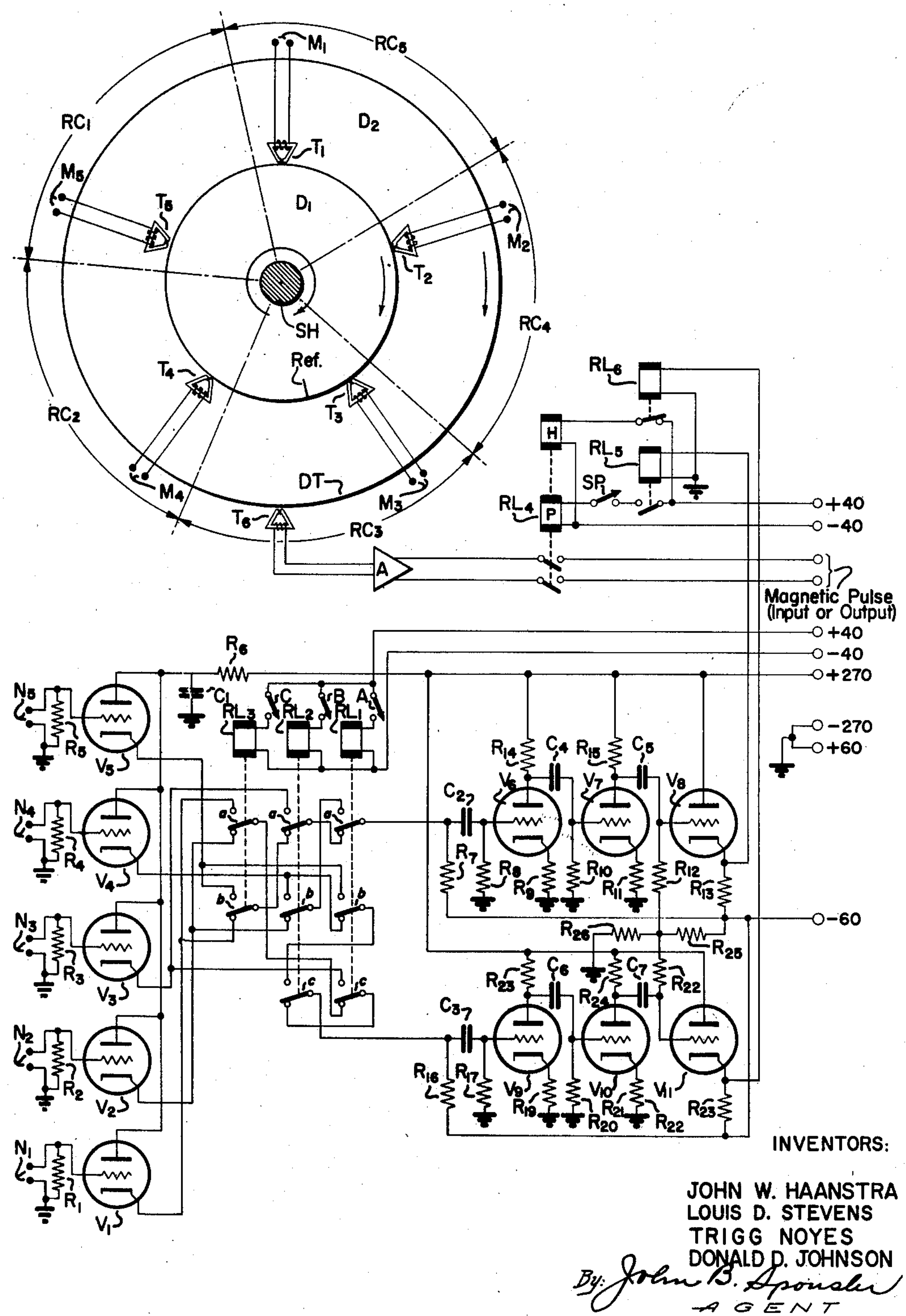
INVENTORS:
JOHN W. HAANSTRA
LOUIS D. STEVENS
TRIGG NOYES
DONALD D. JOHNSON
By: John B. Sponsler
AGENT United States Patent Office 2,866,179

Patented Dec. 23, 1958

2,866,179

RECORD SELECTOR

John W. Haanstra and Louis D. Stevens, San Jose, and Trigg Noyes and Donald D. Johnson, Los Gatos, Calif., assignors to International Business Machines Corporation, New York, N. Y., a corporation of New York Application December 23, 1955, Serial No. 555,007

1 Claim. (Cl. 340—174)

This invention relates to a magnetic recording apparatus, and more particularly to apparatus of this type as disclosed in copending application Serial No. 477,468, filed December 24, 1954.

It is customary in magnetic recording devices utilizing continuously rotating drums and discs to locate specific stored data in the recording paths of the magnetic media by means of a clock track and reference indicia upon the magnetic carrier in such a manner that by reference to the time interval between a reference mark and the desired data location certain data can be recorded or reproduced on the record medium. It is common practice to count the number of recording positions from the reference mark to a position where data is to be recorded or reproduced. One manner of doing this is shown in U. S. Patent 2,587,532. There are other effective ways; however, most of these involve a method similar to that shown in the patent referred to above or a method whereby a comparison is made between data recorded positions and a desired data address.

In the present invention data is recorded upon a path of a continuously rotating magnetic carrier, and an arrangement is provided whereby certain divisions or sectors of the path may be readily selected for reproduction of data therefrom or for the recording of data thereupon. A simple method requiring no pulse counter or comparing circuit is used for locating the divisions or sectors of the magnetic media as hereinafter explained; consequently, the operation of interpreting data relative to its location on the magnetic carrier is greatly simplified.

It is an object of this invention to provide a device for locating data on a cyclic magnetic carrier.

Another object of this invention is to provide apparatus wherein data can be recorded or reproduced on a cyclic magnetic medium having selective areas in a track or a path upon which magnetic representations of data are placed.

Still another object of this invention is to provide a sectionalized magnetic recording record.

Other objects of the invention will be pointed out in the following description and claim and illustrated in the accompanying drawings which disclose, by way of example, the principle of the invention and the best mode which has been contemplated of applying that principle.

In the drawing there is shown a disc D2 mounted concentrically with a second disc D1 upon a shaft SH for continuous rotation. The disc D2 is provided with a magnetic path at or near its periphery whereupon magnetic data may be recorded or reproduced. The disc D1 is of similar nature, and for the purposes of explaining the invention, is shown of smaller diameter; however, the relative size of the discs D1 and D2 is immaterial. The disc D1 has recorded upon it a single magnetic mark located at the periphery of that disc as indicated by Ref. Surrounding the periphery of disc D1 are a plurality of transducers T1, T2, T3, T4, and T5. These transducers coact with the single magnetic recording mark Ref so that as disc D1 is rotated a single magnetic pulse is received successively by each transducer. A transducer T6 is arranged to coact with a path near the periphery of the disc D2 for recording or reproducing data in the manner well known in the art. The output of the transducer T6 is fed to an amplifier Amp, and the output of the amplifier is fed through the normally-open contacts of relay RL4 to a conventional data pulse input or output.

Each of the transducers T1 through T5 is provided with electrical terminals M1 through M5 respectively, these terminals being connected to the respective inputs N1, N2, N3, N4, and N5 of the vacuum tubes V1, V2, V3, V4, and V5. Outputs are derived from these vacuum tubes via cathode connections through a series of relay contacts arranged in a matrix to a pair of amplifier circuits as shown in the drawing. As will be hereinafter explained, each of the amplifier circuits is adapted to provide an output for controlling the operation of relay RL4.

Specifically, the data path DT of the magnetic disc D2 may be said to be divided into five equal sectors or divisions RC1, RC2, RC3, RC4, and RC5 in such a manner that as the disc D2 rotates in a clockwise direction the successive sectors or divisions of the recording path will be presented in that order to the transducer T6 for reading out or writing in of data. It is obvious that in this manner all of the data in a given track of the magnetic record will be encountered by the transducer T6. It is also obvious from the drawing that as the mark Ref encounters the transducer T1 a pulse will be received by that transducer, as has been previously explained. With the connection between the terminals M1 and the terminals N1 completed, the pulse from the transducer T1 will provide a voltage across the vacuum tube V1 so that the tube V1 becomes more conductive, and providing that the relay points of the relays RL1, RL2, and RL3 are in their normal positions as shown in the drawing, the cathode of the tube V1 will raise the potential of the capacitor C2, which is normally held at —60 volts, via the *b* contacts of relay RL3, the *a* contacts of relay RL2, and the *a* contacts of relay RL1. The amplifier circuit represented by the vacuum tubes V6, V7, and V8 will thereupon deliver a positive pulse via the cathode resistor R13 to a relay RL5, which closes its normally-open contact and, providing the switch SP is closed, picks up the relay RL4 thereby closing its contacts so that a circuit is closed from the amplifier of the transducer T6 to the magnetic pulse input or output which is coacting with the magnetic disc path. It is to be noted that with the contacts of relays RL1, RL2, and RL3 connected as shown (in their normal positions) until a pulse is received at the terminals N1, the cathode of V1 is connected to a negative potential; consequently, some current will be flowing through the tube V1, but of insufficient intensity to provide an output from the cathode resistor R13 of tube V8 to actuate the relay RL5. The provision just referred to is purposely introduced into the circuit so that the magnetic pulse received from the transducer T1 solely will not have to energize the cathode circuit of the tube V1.

When the magnetic reference mark Ref passes the transducer T2, the output terminals M2 of transducer T2 being connected to the input terminals N2, the vacuum tube V2 similarly through its cathode will deliver a pulse via the *a* contacts of relay RL3, the *c* contacts of relay RL1, and the *c* contacts of relay RL2 to a capacitor C3 which is the input to the other amplifier circuit previously mentioned. The second amplifier circuit is connected like the first and provides an output from the cathode of tube V11 for actuating a relay RL6. The normally-closed relay contacts of RL6 are included in the holding circuit of the relay RL4; consequently, when the relay RL6 is energized these contacts open and the holding circuit for relay RL4 opens disconnecting the output of the transducer T6 from the magnetic pulse input or output. It is seen, therefore, that the division or sector RC1 of the magnetic data track DT has been selected through the cooperation of the transducers T1 and T2 with the reference mark Ref.

In a similar manner any one of the sectors or divisions of the magnetic track DT can be selected via operation of the switches A, B, and C which energize respectively the relays RL1, RL2, and RL3. Normally, therefore, it is seen that with the contacts of relays RL1, RL2, and RL3 set normally, as shown in the drawing, the record sector RC1 will be read by the transducer T6 for each revolution of the disc D2.

In the event that the record sector RC2 is desired to be read or recorded upon, the switch A is closed whereupon the relay RL1 becomes energized and its *a*, *b*, and *c* contacts transfer. The cathode of the vacuum tube V2 is now connected to the capacitor C2 via the *b* contacts of relay RL2 and the transferred *a* contacts of relay RL1 to provide an input to the capacitor C2 so that the amplifier circuit associated therewith gives an output pulse from the cathode resistor R13 of the vacuum tube V8 to actuate the relay RL5 whereupon (the switch SP being closed) the relay RL4 is picked up and its contacts closed so that the output of the transducer T6 is delivered to the magnetic pulse input or output. When the magnetic reference Ref passes the transducer T3, the output terminals M3 of that transducer being connected to the input terminals N3, the vacuum tube V3 will receive a pulse so that its cathode will in turn deliver a pulse via the transferred *c* contacts of relay RL1 and the normally-closed *c* contacts of relay RL2 to the capacitor C3 and its associated amplifier circuit whereupon a pulse will be delivered via the cathode resistor R21 of the vacuum tube V11 to the relay RL6 to break the holding circuit of relay RL4 thereby opening the contacts of that relay and interpreting the flow of data from the transducer T6 from transducer input or output. In a similar manner any sector or division RC1, RC2, RC3, RC4, and RC5 can be selectively interpreted. For purposes of clarity according to the normal circuits of the relay contacts in the drawing as shown, when none of the relays RL1, RL2, and RL3 are energized via the switches A, B, and C respectively, the sector RC1 of the magnetic path DT will be repetitively selected, when the switch A is closed (relay RL1 being energized) the sector RC2 will be selected, when the switch B is closed (relay RL2 being energized) the sector RC3 will be selected, when the switches A and B together are closed (relays RL1 and RL2 being energized) the sector RC4 will be selected and when the switch C is closed (the relay RL3 being energized) the sector RC5 will be selected.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claim.

What is claimed is:

In a magnetic recording apparatus including a moving record medium having a pair of continuous recording paths, a series of transducers spaced along one said path, a single transducer coacting with the other said path to record or reproduce data thereon, a single magnetic indicium located on the first said path capable of being sensed successively by the transducers of said series, a gating circuit under control respectively of any two transducers of said series for enabling and disabling the said single transducer upon the sensing of said indicium to record or reproduce data on second said path, and means for selecting a controlling pair of transducers from the said series whereby data is recorded or reproduced in a portion of the second said path extending over more than the corresponding spacing of consecutive transducers in the said series.

References Cited in the file of this patent

UNITED STATES PATENTS

| | | |
|---|---|---|
| 2,611,813 | Sharpless, et al. | Sept. 23, 1952 |
| 2,680,239 | Daniels et al. | June 1, 1954 |